US010024965B2

United States Patent
Nehmadi et al.

(10) Patent No.: US 10,024,965 B2
(45) Date of Patent: Jul. 17, 2018

(54) GENERATING 3-DIMENSIONAL MAPS OF A SCENE USING PASSIVE AND ACTIVE MEASUREMENTS

(71) Applicant: VayaVision, Ltd., Nili (IL)

(72) Inventors: Youval Nehmadi, Nili (IL); Shmuel Ur, Shorashim (IL); Ronny Cohen, Ramat Hasharon (IL)

(73) Assignee: VayaVision, Ltd., Or Yehuda (IL)

( * ) Notice: Subject to any disclaimer, the term of this patent is extended or adjusted under 35 U.S.C. 154(b) by 110 days.

(21) Appl. No.: 15/087,222

(22) Filed: Mar. 31, 2016

(65) Prior Publication Data

US 2016/0292905 A1   Oct. 6, 2016

Related U.S. Application Data

(60) Provisional application No. 62/141,296, filed on Apr. 1, 2015, provisional application No. 62/160,988, filed on May 13, 2015.

(51) Int. Cl.
*G06K 9/00* (2006.01)
*G01S 17/08* (2006.01)
(Continued)

(52) U.S. Cl.
CPC .............. *G01S 17/08* (2013.01); *G01C 3/08* (2013.01); *G01C 21/3602* (2013.01);
(Continued)

(58) Field of Classification Search
CPC ........ G01S 17/08; G01S 17/023; G01S 17/42; G01S 17/89; G01S 17/936; G01C 3/08;
(Continued)

(56) References Cited

U.S. PATENT DOCUMENTS

| 5,128,874 A | 7/1992 | Bhanu et al. |
| 5,195,144 A | 3/1993 | Parquier et al. |

(Continued)

FOREIGN PATENT DOCUMENTS

| DE | 10361869 A1 | 7/2005 |
| EP | 2204670 B1 | 6/2014 |

(Continued)

OTHER PUBLICATIONS

The International Search Report and the Written Opinion for PCT/US2016/025252, ISA/RU, Moscow, Russia, dated Aug. 11, 2016.

*Primary Examiner* — Shefali Goradia
(74) *Attorney, Agent, or Firm* — M&B IP Analysts, LLC

(57) ABSTRACT

A method and apparatus for generating 3D-maps for acquiring three-dimensional (3D) maps are presented. The method includes analyzing at least one image acquired by a passive sensor to identify a plurality of objects in the at least one image; classifying the plurality of objects; determining, based on the classification, whether to passively measure a distance to each of the plurality of objects; passively measuring the distance to at least one of the plurality of objects based on the determination; actively measuring a distance to some of the plurality of objects, wherein the distance to one of the same of the plurality of objects is actively measured when the distance to the object cannot be passively measured; and generating a 3D map of a scene based on the distance measured to each of the plurality of objects.

18 Claims, 8 Drawing Sheets

(51) Int. Cl.
| | |
|---|---|
| *G06T 7/20* | (2017.01) |
| *G01C 3/08* | (2006.01) |
| *G01S 17/42* | (2006.01) |
| *G01S 17/89* | (2006.01) |
| *G05D 1/00* | (2006.01) |
| *G06K 9/62* | (2006.01) |
| *G06T 15/00* | (2011.01) |
| *G01S 17/02* | (2006.01) |
| *G01S 17/93* | (2006.01) |
| *G01C 21/36* | (2006.01) |

(52) U.S. Cl.
CPC ............ *G01S 17/023* (2013.01); *G01S 17/42* (2013.01); *G01S 17/89* (2013.01); *G01S 17/936* (2013.01); *G05D 1/0088* (2013.01); *G06K 9/00201* (2013.01); *G06K 9/00791* (2013.01); *G06K 9/00805* (2013.01); *G06K 9/00825* (2013.01); *G06K 9/6202* (2013.01); *G06K 9/6215* (2013.01); *G06K 9/6267* (2013.01); *G06T 7/20* (2013.01); *G06T 15/00* (2013.01); *G05D 2201/0213* (2013.01); *G06T 2200/04* (2013.01); *G06T 2207/10012* (2013.01); *G06T 2207/10052* (2013.01); *G06T 2207/30236* (2013.01); *G06T 2207/30261* (2013.01); *Y10S 901/01* (2013.01)

(58) Field of Classification Search
CPC ............ G01C 3/3602; G05D 1/0088; G06K 9/00201; G06K 9/00791; G06K 9/00805; G06K 9/00825; G06K 9/6202; G06K 9/6215; G06K 9/6267; G06T 7/20; G06T 15/00; G06T 2200/04; G06T 2207/10012; G06T 2207/10052; G06T 2207/30236; G06T 2207/30261; Y10S 901/01

See application file for complete search history.

(56) References Cited

U.S. PATENT DOCUMENTS

| | | | |
|---|---|---|---|
| 5,831,717 A | | 11/1998 | Ikebuchi |
| 5,896,103 A | | 4/1999 | Bunch |
| 5,923,417 A | | 7/1999 | Leis |
| 6,323,941 B1 | * | 11/2001 | Evans ............... G01S 17/023 250/339.02 |
| 6,502,053 B1 | | 12/2002 | Hardin et al. |
| 6,553,130 B1 | | 4/2003 | Lemelson et al. |
| 7,385,626 B2 | | 6/2008 | Aggarwal et al. |
| 7,508,496 B2 | | 3/2009 | Mettenleiter et al. |
| 7,619,754 B2 | | 11/2009 | Riel et al. |
| 7,852,461 B2 | | 12/2010 | Yahav |
| 7,957,639 B2 | | 6/2011 | Lee et al. |
| 8,125,622 B2 | | 2/2012 | Gammenthaler |
| 8,189,051 B2 | | 5/2012 | Shih et al. |
| 8,290,208 B2 | | 10/2012 | Kurtz et al. |
| 8,446,492 B2 | * | 5/2013 | Nakano ............... H04N 13/025 348/236 |
| 8,547,374 B1 | | 10/2013 | Sadjadi et al. |
| 8,548,229 B2 | | 10/2013 | Badino et al. |
| 8,587,686 B1 | | 11/2013 | Riza et al. |
| 8,723,717 B2 | | 5/2014 | Saito |
| 8,736,818 B2 | | 5/2014 | Weimer et al. |
| 8,761,594 B1 | | 6/2014 | Gross et al. |
| 8,791,851 B2 | | 7/2014 | Elad et al. |
| 9,164,511 B1 | | 10/2015 | Ferguson et al. |
| 9,188,980 B2 | | 11/2015 | Anderson |
| 2005/0200832 A1 | | 9/2005 | Kawai et al. |
| 2006/0274918 A1 | | 12/2006 | Amantea et al. |
| 2007/0189455 A1 | | 8/2007 | Allison |
| 2008/0199165 A1 | | 8/2008 | Ng et al. |
| 2010/0014781 A1 | * | 1/2010 | Liu ............... H04N 13/0022 382/285 |
| 2010/0040285 A1 | * | 2/2010 | Csurka ............... G06K 9/00624 382/170 |
| 2010/0191117 A1 | | 7/2010 | Kabakov |
| 2010/0245535 A1 | * | 9/2010 | Mauchly ............... G06T 15/20 348/14.08 |
| 2010/0315618 A1 | | 12/2010 | Hertzman |
| 2011/0141306 A1 | * | 6/2011 | Nakano ............... H04N 13/025 348/222.1 |
| 2011/0292406 A1 | | 12/2011 | Hollenbeck et al. |
| 2012/0026510 A1 | | 2/2012 | Crampton et al. |
| 2012/0148100 A1 | * | 6/2012 | Kotake ............... G06T 7/0046 382/103 |
| 2012/0314037 A1 | | 12/2012 | Nehmadi et al. |
| 2012/0326959 A1 | | 12/2012 | Murthi et al. |
| 2013/0021595 A1 | | 1/2013 | Guetta |
| 2013/0107065 A1 | | 5/2013 | Venkatraman et al. |
| 2013/0174102 A1 | * | 7/2013 | Leu ............... G05B 19/41875 716/52 |
| 2014/0077988 A1 | | 3/2014 | Saito |
| 2014/0078263 A1 | | 3/2014 | Kim |
| 2014/0094307 A1 | | 4/2014 | Doolittle et al. |
| 2014/0132722 A1 | | 5/2014 | Bauza et al. |
| 2014/0139639 A1 | | 5/2014 | Wagner et al. |
| 2014/0267631 A1 | | 9/2014 | Powers |
| 2015/0071541 A1 | * | 3/2015 | Qutub ............... G06T 7/0093 382/173 |
| 2015/0340875 A1 | * | 11/2015 | Prasad ............... G06F 1/3203 307/104 |
| 2015/0356357 A1 | | 12/2015 | McManus et al. |
| 2016/0018526 A1 | | 1/2016 | Bossche et al. |

FOREIGN PATENT DOCUMENTS

| | | |
|---|---|---|
| WO | 2000012960 A1 | 3/2000 |
| WO | 2008070319 A2 | 6/2008 |

\* cited by examiner

//USPTO patent text

GENERATING 3-DIMENSIONAL MAPS OF A SCENE USING PASSIVE AND ACTIVE MEASUREMENTS

CROSS-REFERENCE TO RELATED APPLICATIONS

This application claims the benefit of U.S. Provisional Application No. 62/141,296 filed on Apr. 1, 2015 and U.S. Provisional Application No. 62/160,988 filed on May 13, 2015, the contents of which are hereby incorporated by reference.

BACKGROUND

An autonomous car (also known as a driverless car, self-driving car, or robotic car) is a vehicle that navigates without human control. An autonomous vehicle senses its environment to detect surroundings using radar, Lidar, GPS, Odometer, or computer vision. Advanced control systems interpret sensory information to identify appropriate navigation paths, as well as obstacles and relevant signage. Autonomous cars are equipped with control systems for analyzing sensory data in order to distinguish between different cars or obstacles on the road. Currently, driverless technology is developed by Google®, Tesla®, and some other vehicles manufactures, such as Audi®, BMW®, Nissan®, and the like.

Other companies such as, e.g., Mobileye®, are in the marketplace trying to provide solutions for hands-free driving technology. Use of this technology is typically limited to particular driving infrastructures such as, e.g., highways or country roads. The corner-stone of such hands-free driving and autonomous vehicles technologies is the rendering or generation of a 3-dimensional (3D) map of a scene at any given moment during or immediately prior to motion. Such a map tries to mimic a scene as would have been seen by a driver.

The rendering of such 3D-maps is typically accomplished by measuring distances to many points in the 3D space to determine the existence of objects and their respective distances from the vehicle. The rendered 3D-maps may be combined and processed to produce driving decisions by the vehicle. Existing solutions for rendering detailed 3D-maps are based on LiDar (or LADAR) systems. A LiDar system measures distance to an object by illuminating multiple targets (points in the space) with one laser beam or multiple laser beams. Such existing solutions configure the LiDar system to scan the entire environment (scene). This requires a large number of laser measurements to render a single 3D-map.

For example, FIG. 1 shows an image 100 of a scene for which a 3D-map is generated. Some existing solutions implemented by hands-free and autonomous driving technologies measure the distance to each point 110 in the image 100. Thus, a laser beam illuminates each such point to render the 3D-map. In many examples, the LiDar system does not have any prior knowledge of the scene, e.g., a picture of the scene. To this aim, such technologies are based on very complex and expensive equipment. For example, a robotic car made by Google® includes equipment with a LiDar system worth about $70,000. The LiDar system includes a 64-beam laser. Due to the high cost of the hardware for rendering the 3D-maps, mass production of autonomous vehicles is not feasible. It should be noted that only a few points 110 are specifically labeled in FIG. 1 merely for simplicity purposes.

In addition, widespread production of the autonomous vehicle using existing Lidar systems would create hazardous conditions to pedestrians, drivers and/or passengers because of the high number of laser beams that would be transmitted from each vehicle and would likely hit a person in the line of sight. Further, the existing LiDar solutions are configured to transmit laser beams at the highest available energy level. This is performed to measure a point at a maximum range of the Lidar system.

Moreover, the generation of 3D-maps by scanning the entire scene will increase the crosstalk. This is due to the high number of laser beams being transmitted by autonomous vehicles equipped with such scanning systems. As a result, the resulting resolution of 3D-maps generated by scanning the entire scene may be limited.

It would therefore be advantageous to provide a solution for generating 3D-maps that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for acquiring three-dimensional (3D) maps. The method includes analyzing at least one image acquired by a passive sensor to identify a plurality of objects in the at least one image; classifying the plurality of objects; determining, based on the classification, whether to passively measure a distance to each of the plurality of objects; passively measuring the distance to at least one of the plurality of objects based on the determination; actively measuring a distance to some of the plurality of objects, wherein the distance to one of the same of the plurality of objects is actively measured when the distance to the object cannot be passively measured; and generating a 3D map of a scene based on the distance measured to each of the plurality of objects.

Certain embodiments disclosed herein also include an apparatus for acquiring three-dimensional (3D) maps. The method comprises a passive sensor for acquiring images of a scene; an active sensor for measuring distances from objects in the scene; and a processing system, wherein the processing system is configured to: analyze at least one image acquired by the passive sensor to identify a plurality of objects in the at least one image; classify the plurality of objects; determine, based on the classification, whether to passively measure a distance to each of the plurality of objects; passively measure the distance to at least one of the plurality of objects based on the determination; actively measure, by the active sensor, a distance to some of the plurality of objects, wherein the distance to one of the plurality of objects is actively measured when the distance to the object cannot be passively measured; and generate a 3D map of a scene based on the distance measured to each of the plurality of objects.

Certain embodiments disclosed herein also include a method for acquiring three-dimensional (3D) maps. The method comprises acquiring at least one image by a passive sensor; segmenting the at least one image to render a segmentation map; actively measuring a distance value to each pixel of a first number of pixels in each segment identified in the segmentation map, wherein the first number of pixels is less than the number of pixels in each segment; computing a distance value to each pixel in the segment using the distance of pixel in the first number of pixels; and generating a 3D map of a scene based on the measured and computed distance values.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
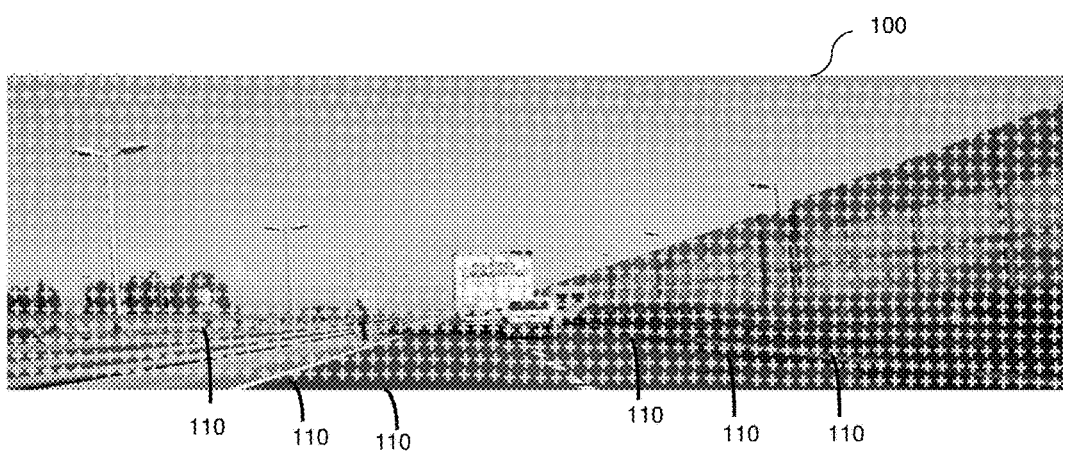
FIG. 1 is a picture of a scene for which a 3D-map is generated using a conventional approach.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, 3D-maps are rendered or otherwise generated based on active measurements, passive measurements, and/or analysis of information related to such measurements. In some embodiments, the 3D-maps may be based on measurements captured from a vehicle. In an embodiment, active measurements are laser measurements, while passive measurements are achieved by image processing. Therefore, the disclosed embodiments allow for provision of a complete 3D-map of a scene while using a small number of low-energy laser beams. The scene may be a field of view captured by an apparatus for causing generation of the 3D-map. In certain configurations, the disclosed embodiments can be utilized to generate a high-resolution 3D-map of certain sections of the environments without performing active measurements for the entire scene. The utilization of a few active measurements reduces the risk of human exposure to laser beams.

Figure 2:
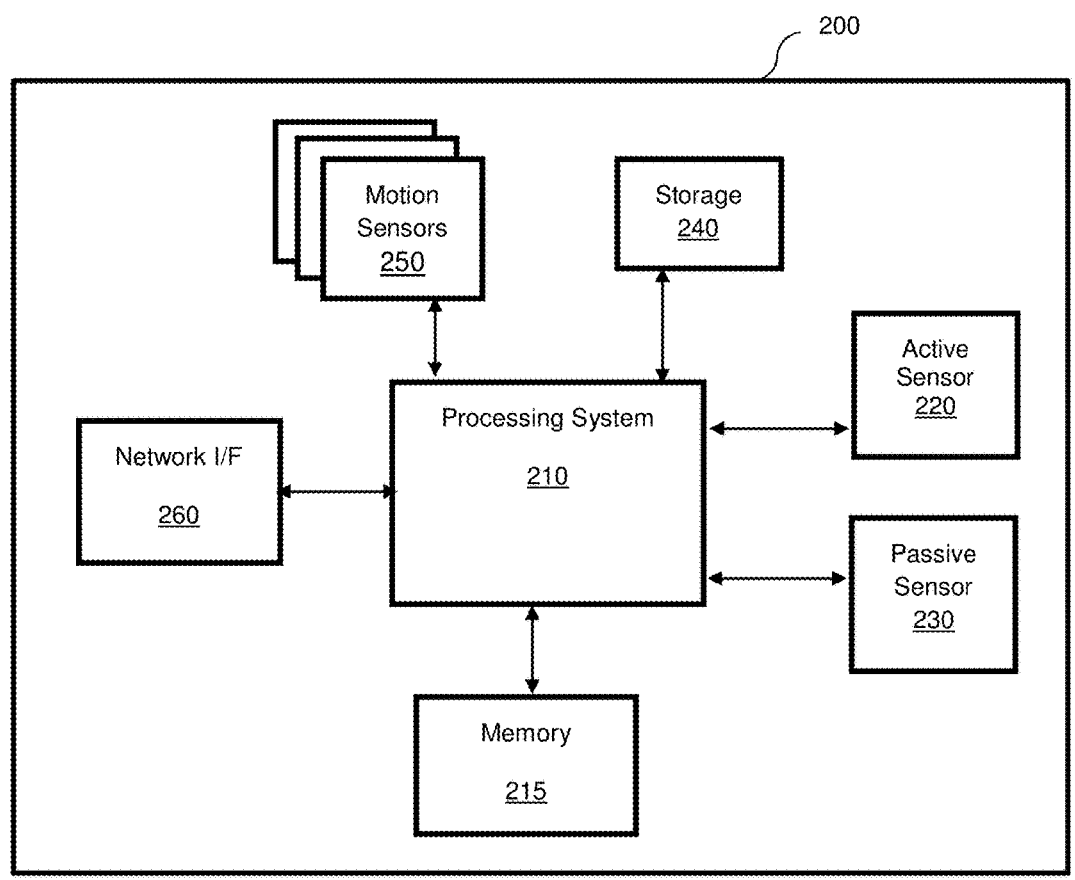
FIG. 2 is a block diagram of an apparatus configured to generate 3D-maps from a vehicle according to one embodiment.

FIG. 2 shows an example block diagram of an apparatus 200 configured to generate 3D-maps from a vehicle according to one embodiment. The apparatus 200 includes a memory 215, an active sensor 220, and a passive sensor 230 connected to the processing system 210. In certain configurations, the apparatus 200 further includes a storage 240, one or more motion sensors 250, and a network interface 260 connected to the processing system 210.

The apparatus 200 can be, e.g., mounted on or integrated in a vehicle. Such a vehicle may include, for example, a car, a truck, a bus, a drone, a robot, and the like. The apparatus 200 can be utilized to generate 3D-maps of the scene as would be observed by an operator (e.g., a driver) of the vehicle. In an embodiment, the apparatus 200 is configured to control part or all of the operation of the vehicle based on analysis of the generated 3D-maps. Therefore, the apparatus 200 can be utilized in applications related to autonomous vehicles, hands-free driving systems, driver assistance systems, and the like.

The passive sensor 230 may be an image sensor (e.g., a camera) configured to passively acquire images. The acquired images can be processed by processing system 210 or by the passive sensor 230 using image processing techniques.

The active sensor 220 is configured to perform active measurements in specific directions to determine the distance from objects in the scene. In an embodiment, the active measurements are laser measurements. In a further embodiment, the active sensor 220 is configured to illuminate light beams in specific directions (determined by, e.g., the processing system 210) and to detect the light beams reflected off of objects in the scene. The distance from an object can be computed based on the energy and reflection angle of each reflected light beam. The active sensor 220 can be realized as, but not limited to, an active stereovision, a structured light, a time-of-flight (TOF), and the like.

The processing system 210 is configured to process data (e.g., energy level, direction, reflection angle of the emitted and reflected beam) in order to generate a 3D-map of the entire environment or of certain objects in the environment. As will be discussed below, the number of active measurements is limited to certain points and/or surfaces in the space as the initial scanning is performed using the image or images acquired by the passive sensors 230. In an embodiment, to create the 3D-map additional information, such as previously acquired images or previously generated 3D-maps, previously determined active measurements and/or sensory information be gathered from the motion sensors 250 may be utilized. The motion sensors 250 may include, but are not limited to, a global positioning system (GPS), an accelerometer, a proximity sensor, an odometer, and the like. The additional information together with the active/passive measurements can be utilized by the processing system 210 to determine a size of each object, its speed, and its direction relative to the vehicle.

According to certain embodiments, the processing system 210 is configured to generate 3D maps. To this end, the processing system 210 may be configured to fuse active and passive measurements; determine stationary or nearly stationary objects; actively measure the distance only from moving objects; and estimate distance from objects using the top possible velocity of objects and/or using passive measurements.

The fusion of active and passive measurements may include utilizing the active sensor 220 to measure objects in areas were the passive sensor 230 does not provide a reliable measurement. Whether the passive sensor 230 can provide a reliable measurement for an object may be based on, but not limited to, a classification of the object, a visibility of the object in the image, and the like. In an embodiment, if a reliable passive measurement can be achieved, the active sensor 220 is not utilized. Thus, the disclosed embodiments may significantly reduce the number of active measurements performed by the active sensor 220.

As such, fewer laser beams or other sources may be utilized, thereby reducing energy consumption, crosstalk, and hazardous conditions, as well as achieving higher resolution. In an embodiment, the apparatus 200 can be configured such that only suspicious objects will be actively measured using the active sensor 220. A suspicious object may be any object that requires active measurement to accurately generate a map based thereon. The classification of objects are discussed below. An object may be suspicious if, e.g., the object is non-stationary (i.e., moving) and/or in close-proximity to the apparatus 200. As an example, if the apparatus 200 is mounted on a car, pedestrians will be considered as suspicious objects while trees in the background are not.

In an embodiment, the processing system 210 is configured to determine which object is stationary or near stationary based on images provided by the passive sensor 230. For example, using image recognition, the processing system 210 may be configured to determine stationary objects such as, e.g., a house, a tree, a pole, etc. In a further embodiment, when the passive sensor 230 is fixed, the processing system 210 may be configured to determine if an object is stationary by comparing two consecutive images and determining which objects have been moved relative to stationary objects, based on the comparison. As an example, if the passive sensor is fixed to the side of a building in an environment, consecutive images may be compared to determine whether any objects in the scene have been moved relative to stationary objects.

In yet a further embodiment, determining whether objects are stationary may be based on comparisons of frames (e.g., images) captured by the passive sensor 230. The comparisons may include, but are not limited to, determining changes in distances between sets of points in the frames. In an example embodiment, each distance change between two points may be equal to a difference between the 3D distance between the points as seen in a first frame with the 3D distance between the points as seen in a second frame. Any object that is determined to have moved may be associated with a non-stationary object. In an embodiment, an object may be determined to have moved if, for example, a sum of all distance changes related to the object is above a predefined threshold. In another embodiment, an object may be determined to have moved if the sum of distance changes related to the point is greater than the sum of distance changes related to each of the other objects above a predefined threshold. In yet another embodiment, an object may be determined to have moved if a distance change related to an object in a subsequent frame is greater than a distance change related to the object in a prior frame above a predefined threshold.

Figure 8:
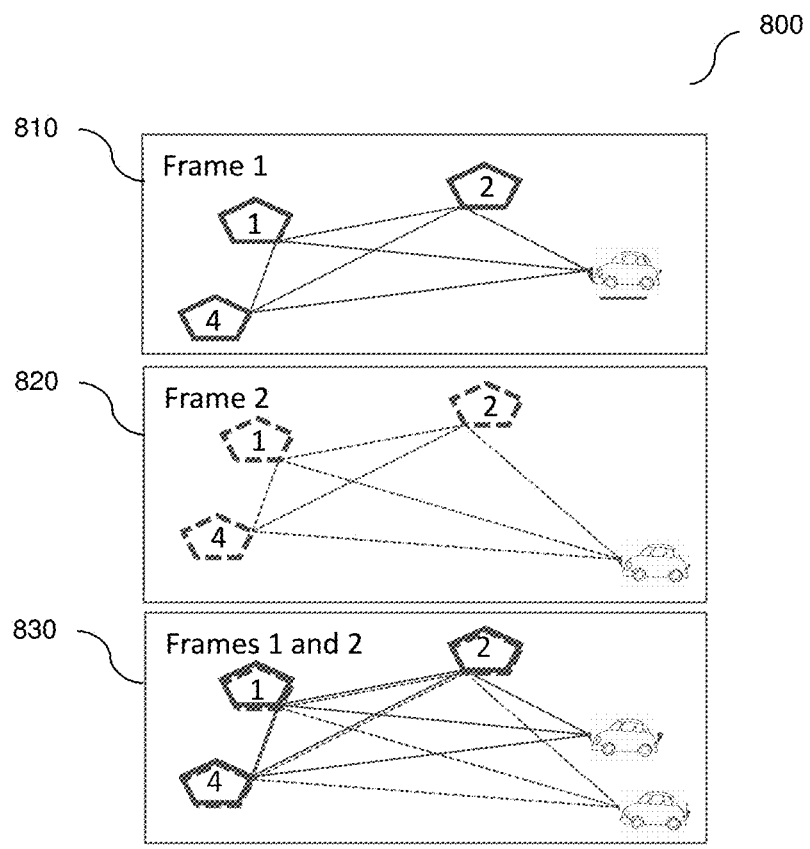
FIG. 8 is a screenshot utilized to describe determining whether objects are stationary based on distance changes between frames.

FIG. 8 is an example diagram 800 utilized to describe using distance changes between frames to determine whether objects are stationary. In the example screenshot 800, each of the frames 810 through 830 shows positions of points (that may represent objects) 1, 2, 3, and 4 in an image, as well as the distances between each pair of the points 1, 2, 3, and 4. The overlaid frame 830 shows frame 820 overlaid on top of frame 810. As can be seen in frame 830, the points 1, 2, and 4 are in roughly the same position in each of the frames 810 and 820. However, the point 3 is in a different position in frame 810 than it is in frame 820. The sum of distance changes related to point 3 may be the sum of distance changes between frames 810 and 820 for pairs of points 1 and 3, 2 and 3, and 4 and 3. As a result, the sum of distance changes related to point 3 will be greater than 0 between frames 810 and 820, and may be above a predefined threshold. Additionally, the sum of distance changes related to point 3 will be greater than the sum of distance changes related to each of points 1, 2, and 4. Accordingly, it may be determined that an object associated with point 3 has moved between the frames 810 and 820.

In another embodiment, determining whether objects in images are stationary may be based on predicted locations of objects in an image. A prediction image may be generated based on a frame of a currently acquired image or generated 3D-map. The prediction image may be further based on a movement of the sensor acquiring the current image or providing information used to generate the current 3D-map. Based on the current frame and/or any new position or orientation of the sensor, a prediction frame illustrating predicted positions of the objects at a subsequent time (assuming the objects do not move) is generated. The prediction frame may be compared to a subsequent frame based on sensor readings at the subsequent time to determine if there are any differences between locations of the objects. In an embodiment, if a difference in location of an object between the prediction frame and a corresponding subsequent frame is above a predefined threshold, it may be determined that the object has moved.

In an embodiment, when the passive sensor 230 is in motion, the distance from stationary objects can be measured using GPS and the speed of the car. In another embodiment, the distance from stationary objects can be measured without using GPS by comparing frames (e.g., acquired images) of passive sensor information and/or 3D mapping information. In a further embodiment, finding the distance and/or angle change between any two frames may be determined, for each pair of corresponding points in the frames, based on a weighted score. To this end, in an embodiment, finding the distance or angle change between two frames may further include determining matching or otherwise corresponding points in the frames. In yet a further embodiment, the weighted score may be based on, but not limited to, a degree of error associated with the distance of the point in each frame such as, e.g., error based on noise.

In a further embodiment, a prediction frame may be generated based on 3D or 2D mapping information as well as a location and orientation of a sensor. The prediction frame may be a 3D image illustrating predicted positions of stationary (i.e., non-moving) objects included in the 3D-mapping information. Such stationary objects may include, but are not limited to, trees, billboards, signs, buildings, and other permanent or semi-permanent items or fixtures. The prediction frame may be utilized to, e.g., fill in exposed gaps of a previous frame (for example, when an object moves, the prediction frame may be utilized to illustrate a prediction for items behind the previous location of the moved object).

In another embodiment, the passive measurements may be performed based on movements of objects classified as non-stationary and non-suspicious. To this end, passively measuring the distance may include, but is not limited to, determining a boundary speed of the object and a direction of movement of the object. The boundary speed is a speed at which the boundary (i.e., outer surface) of the object is traveling. Based on the determined boundary speed and direction, a distance to the object may be estimated. In an embodiment, the estimated distance may be further based on a previously known distance to the object and/or previously generated 3D-maps including the object.

In a further embodiment, the processing system 210 is configured to estimate the distance from non-stationary objects using a maximum and/or minimum possible speed of such objects. The maximum or minimum possible speed of an object may be utilized as the boundary speed. For example, if a distance from a pedestrian is first measured, then the distance range (e.g., between 0 and 2 meters) representing possible distances of that pedestrian at a given time can be determined based on a predetermined maximum velocity of a person.

The processing system 210 will not trigger another active measurement with respect to the pedestrian if the pedestrian is located within a range that does not require any action (e.g., walking in a sidewalk across the street from the vehicle). An action may include, for example, controlling the vehicle. Whether an action is required may be based on a predefined safe distance threshold. The safe distance threshold may include, but is not limited to, the speed of the vehicle and/or object, the distance of the object from the apparatus 200, a type of the object, combinations thereof, and the like. In a further embodiment, active measurements may be performed when an estimated distance for a moving object (e.g., based on a boundary speed and a direction of the object) does not meet a safe distance threshold. An action may include, for example, controlling a hands free or autonomous vehicle.

In an embodiment, the processing system 210 is configured to estimate the distance of the processing system 210 from non-stationary and stationary objects using passive measurements. Specifically, the distance may be estimated based on the object's approximate size and the amount of pixels the object occupies in an image acquired by the passive sensor 230. Such an estimation may further include determining if the object is in close-proximity to the vehicle or not. For some objects that are not in close-proximity, no active measurement by the active sensor 220 is required. The close-proximity can be set based on a predefined threshold (e.g., a distance of under 100 meters may be determined to be in close-proximity).

Figure 3A:
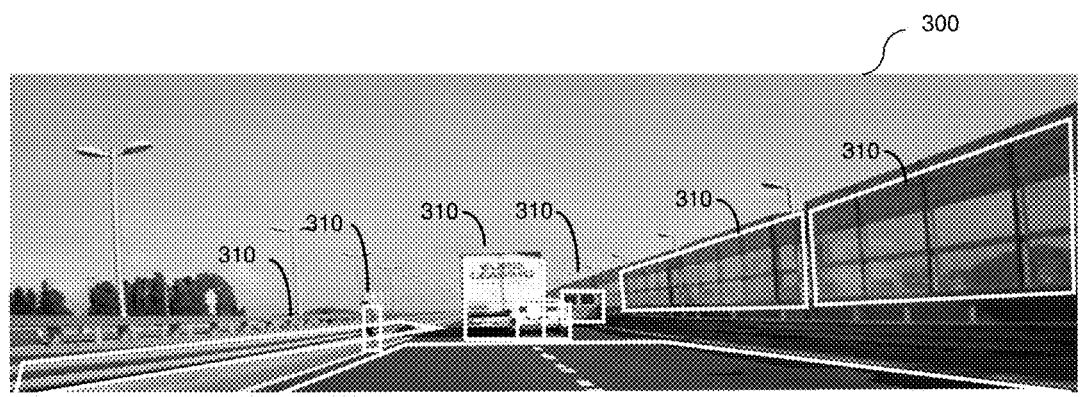
FIGS. 3A and 3B showing identification of objects in an image according to an embodiment.
Figure 3B:
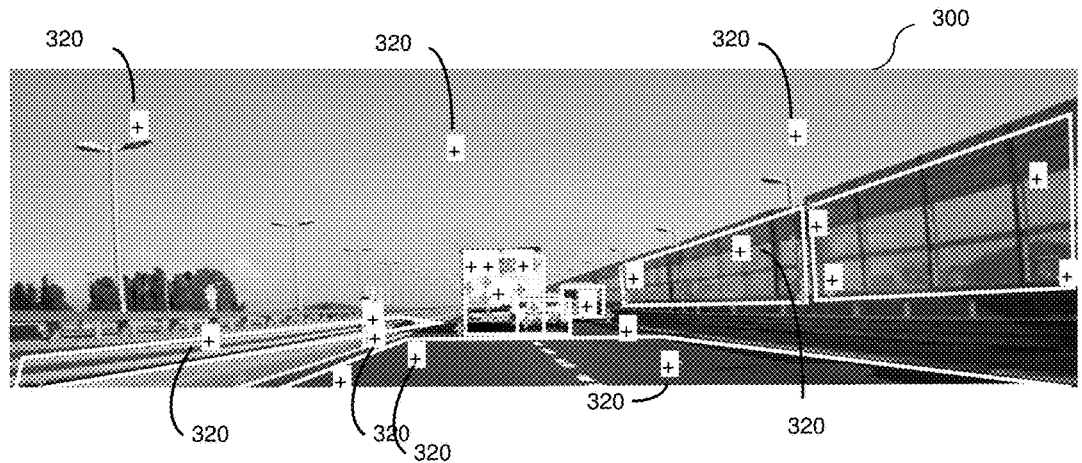

Consideration of certain (e.g., suspicious) objects allows reducing the number of active measurements by the active sensor 220. This is further demonstrated in reference to FIGS. 3A and 3B showing an example image of a scene for which a 3D-map is generated according to the disclosed embodiment. First, an image 300 of the environment is acquired by the passive sensor 230. The image 300 is segmented to identify objects 310. The segmentation and identification of objects can be performed using conventional image processing techniques. For example, the road, pedestrian, car, van, truck, crash barrier, and noise barrier are identified as objects 310. Then, object classification and passive measurements are performed. Based on the object classification, it is determined which active measurements should be made, that is, where to direct the laser beams emitted by the active sensor 220. The classification of objects may determine which objects are stationary, non-stationary, and suspicious. For example, the pedestrian, the car, the van, and the truck are classified as non-stationary and suspicious objects and, as such, active measurements in many different directions are triggered at locations 320 based, in part, on the object classification. The road, crash barrier, sky, road and sound barrier wall are classified as stationary and non-suspicious objects and, accordingly, fewer active measurements are performed.

As demonstrated by FIG. 3B, only a portion of the scene acquired in the image 300 is scanned with the active sensor 220. The locations active measurements are labeled as 320. Performing a greater number of active measurements on a limited number of objects allows for providing a higher resolution with respect to these objects. This further enables providing higher resolution in certain areas where detail recognition is required.

It should be noted that FIGS. 3A and 3B are merely examples and do not limit the various disclosed embodiments. In particular, more, fewer, or different objects 310 and/or 320 may be identified for images without departing from the scope of the disclosure.

Once all measurements are completed, a 3D-map of the scene may be generated. Specifically, the 3D-map is generated by computing the distance of the apparatus from any pixel in the acquired image. That is, each pixel should be associated with a distance value in order to generate the 3D-map. The distance values may be derived from the passive measurements and active measurements. In an embodiment, only a set of distance measurements are performed (e.g., fewer measurements than the number of pixels). The distance values can be computed or extrapolated using a plane equation or other equivalent techniques.

Returning to FIG. 2, the processing system 210 may comprise or be a component of a processor (not shown) or an array of processors coupled to the memory 215. The memory 215 contains instructions that can be executed by the processing system 210. The instructions, when executed by the processing system 210, cause the processing system 215 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system 210 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The storage 240 may be magnetic storage, optical storage, and the like, and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

In one configuration, computer readable instructions for implementing any of the embodiments disclosed herein may be stored in the storage 240. The storage 240 may also store other computer readable instructions to implement an operating system, an application program, and the like. Computer readable instructions may be loaded in the memory 215 for execution by the processing system 210. The storage 240 may also be configured to store, for example, images, generated 3D-maps, 3D or 2D maps provided by mapping services (e.g., street-level maps), and the like.

The network interface 260 may allow the apparatus 200 to communicate with other apparatuses such as, but not limited to, a controller of the vehicle (not shown), a central controller (not shown), and a cloud storage device (not shown). For example, the network interface 260 may be configured to allow the apparatus 200 to communicate with the controller of the vehicle to provide operating instructions (e.g., stop, turn right, etc.) over a network (not shown). In an embodiment, the network interface 340 allows remote access to the apparatus 200 for the purpose of, for example, configuration, loading of new maps, and so on. The network interface 260 may include a wired connection or a wireless connection. The network interface 260 may transmit and/or receive communication media. For example, the network interface 260 may include a modem, a network interface card (NIC), an integrated network interface, a radio frequency transmitter/receiver, an infrared port, a USB connection, and the like.

Figure 4:
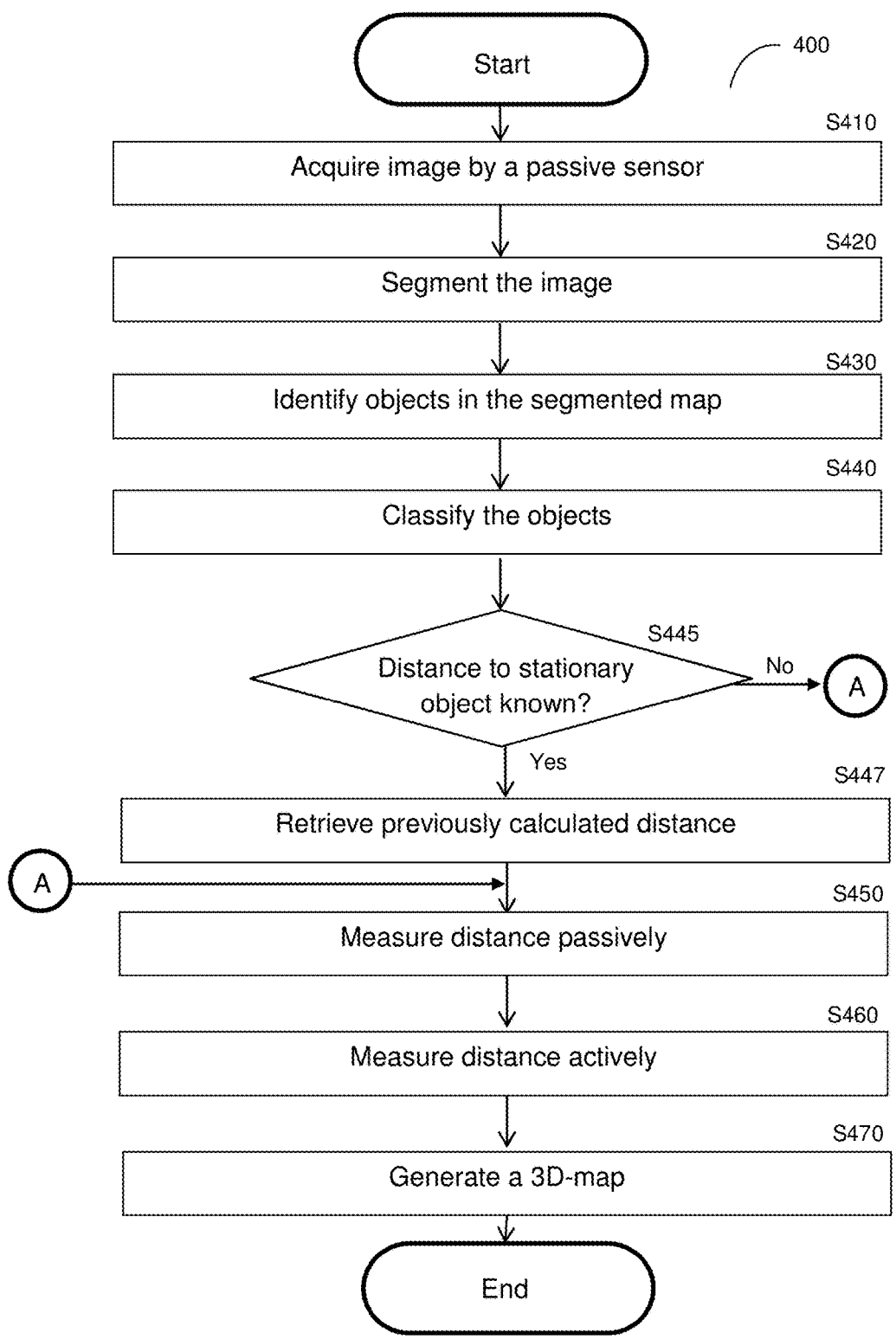
FIG. 4 is a flowchart illustrating a method for generating a 3D-map of a scene according to an embodiment.

FIG. 4 is an example flowchart 400 illustrating a method for generating 3D-maps of a scene according to an embodiment. In an embodiment, the method may be performed by an apparatus (e.g., the apparatus 200) operable in a vehicle and the generated 3D-map is of the scene as would have been seen by an operator of the vehicle. The 3D-map may be generated based on fusion of passive and active measurements.

At S410, one or more images is acquired by a passive sensor. In an embodiment, the acquired images are saved in a memory according to their acquisition order. In another embodiment, the acquired images may include frames from a video being continually recorded.

At optional S420, the image may be segmented to generate a segmentation map. The segmentation map includes a plurality of segments, each of which features homogeneous pixels having the same color or substantially similar colors.

At S430, objects in the image or in the segmentation map are identified. In one embodiment, the objects may be identified based on, e.g., image recognition. It should be noted that an object can include multiple segments. For example, a truck colored with two different colors can be segmented as two segments, but identified as one object.

At S440, the identified objects are classified. In an embodiment, the objects may be classified into one or more of the following categories: non-stationary (i.e. moving or likely to move), stationary (i.e., immobile), non-suspicious, or non-suspicious. In an embodiment, whether an object is non-stationary or stationary may be determined by identifying the object (e.g., using image recognition) and based on its type. For example, an object showing a building may be classified as non-stationary. In another embodiment, the non-stationary or stationary category of an object is determined by comparing two consecutive images taken during a predefined time interval to determine if the location of an object has changed. If the location of the object remains the same, the object is classified as stationary; otherwise, the object may be classified as non-stationary. In another embodiment, the object classification for some of the identified objects may be based on the size of the identified object. As a non-limiting example, an object having a size above a predefined threshold (e.g., an object large enough that a vehicle would need to navigate around the object) may be classified as suspicious, but an object having a size below the predefined threshold (e.g., an object small enough that the vehicle can ride over the object safely) may be classified as non-suspicious.

In an embodiment, the classification based on the image comparisons may be further based on movement (or lack thereof) and/or positioning of the passive sensor. Specifically, when the passive sensor is not in motion (e.g., the vehicle stops at a traffic light) and the two consecutive images are taken from the same angle, the comparisons may indicate changes in the location of a moving object relative to other objects. When the passive sensor itself is in motion, the two consecutive images are taken from different angles. To allow accurate comparison, in an embodiment, a second image (e.g., the subsequently taken image) may be transformed to match an angle of a first image (e.g., a previously taken image), thereby placing the two images at the same angle. The image transformation can be performed using a virtual camera technique. It should be noted that, in one scene, an object can be classified as stationary, while in the next scene the object may be classified as non-stationary (e.g., a parked car). In an embodiment, the classification of stationary objects can be performed based in part on geographic maps such as 3D, 2D, street-view, and/or satellite maps provided mapping services. This allows identification of buildings and the like based on their known locations.

In an embodiment, the classification of suspicious objects is based on a predetermined list of suspicious objects. For example, objects predetermined to be suspicious may be, but are not limited to, other vehicles on the road, pedestrians, animals, debris on the road, and so on. The list can be dynamically updated. Typically, objects that are in close-proximity to the vehicle and may pose danger or hazard are classified as suspicious. It should be noted that an object can be classified as "suspicious and stationary" or "suspicious and non-stationary". The various embodiments for object classifications are discussed in detail above.

At S445, it is checked, for each object classified as stationary, if the distance to the object classified as stationary is known. If so, execution continues with S447; otherwise, execution continues with S450. At S447, the distance to the stationary object is retrieved from previous calculations. This distance information can be derived from previously generated 3D maps. A stationary object may be determined to be stationary relative to the previously generated 3D map. As an example, if a passive sensor is not moving, an object is stationary, and a previously determined passive measurement and/or active measurement distance is available for the object from that passive sensor, then the current passive measurement for the object may be determined to be the previously determined distance.

At S450, passive measurements are performed based on the acquired image. The passive measurements include measuring at least a distance from at least one, some or all the classified objects. As noted above, such measurements are performed if the information cannot be derived from previously generated 3D maps. In an embodiment, the distance from each object classified as "stationary" or "non-suspicious and non-stationary" is determined via the passive measurements. As noted above, the distance is passively measured for stationary objects when the distances of the stationary objects are not available. In an embodiment, the passive measurement may include determining the distance to an object in the acquired image using a known size (e.g., number of pixels) of the object, a distance from a valid reference point, a vanishing point and vanishing line, a movement of an apparatus or vehicle, and so on. Various embodiments for performing passive measurements are discussed in more detail herein below with reference to FIGS. 5 and 6. The distance measurements may be saved in a memory (e.g., memory 215). It should be noted that the distance measurement may be for all or any of the pixels composing the object.

In another embodiment, the passive measurements may be performed based on movements of objects classified as non-stationary and non-suspicious. To this end, passively measuring the distance may include, but is not limited to, determining a boundary speed of the object and a direction of movement of the object. The boundary speed is a speed at which the boundary (i.e., outer surface) of the object is traveling. Based on the determined boundary speed and direction, a distance to the object may be estimated. In an embodiment, the estimated distance may be further based on a previously known distance to the object and/or previously generated 3D-maps including the object.

At S460, active measurements are performed. In an embodiment, the active measurements may be performed by using an active sensor (e.g., the active sensor 220). Performing the active measurements may include measuring a distance from some or all of the classified objects. In an embodiment, the distance is actively measured from objects classified as "suspicious", "non-stationary", and/or "suspicious and non-stationary". In another embodiment, the distance is actively measured when a reliable passive measured cannot be achieved. Reliable passive measurements cannot be achieved include when, for example, one or more objects and/or details in the acquired image appear several times; the image contains plain areas with no definite texture (e.g., walls and sky); details (wheels in a car) in the image are hidden in another view; when only one image from a unique angle (e.g., when the passive sensor includes only one camera) is available for passive measurement; and when the image contains one or more noisy areas. By re-measuring such objects, the accuracy is increased and the number of false alarms is significantly decreased.

In an embodiment, S460 includes emitting a laser beam (or a light pulse) using a laser diode. The laser hits a target and a portion of the laser's energy is reflected back toward the active sensor. The returning signal is detected and the time elapsed between emission of the light pulse from the laser and the detection of the returned signal is determined. A distance measurement of the distance to the object may be determined based on the determined elapsed time. It should be noted that the distance measurement may be for any or all of the pixels composing the images. In an embodiment, multiple active measurements may be performed per object, where at each such measurement, a laser pulse is directed to a different angle. A resolution of the measurement may be based on the number of measurements performed for each object.

The timing, direction, and energy level for each emitted laser beam may be controlled to achieve an accurate distance measurement. In an embodiment, at least the direction of the laser beam is adjusted based on the time and location difference between the time that an image was acquired by the passive sensor and when the active measurement has been triggered. This is performed in order to compensate for the movement of the active sensor and/or a target object during that time. The direction in which to point the active sensor can be estimated using accelerometer information by determining a current location of the active sensor relative to its location when the image was acquired.

It should be noted that the active measurements performed at S460 may be based on other active transmissions or emissions such as, but not limited to, radar, sound, laser triangulation, and the like. It should be noted that S450 and S460 can be performed in parallel. For example, active measurements on can be performed in parallel on objects classified non-stationary and/or objects that cannot be passively measured.

In certain embodiments, the energy level of the emitted laser is controlled based on the proximity of object to the vehicle (or the active sensor). The proximity can be determined using previous active and/or passive measurements in the area being scanned. By controlling the energy level, the energy consumption of the active sensor may be reduced as compared to always using laser beams having the highest possible amount of energy. Further, controlling the energy levels reduces the risk hurting human by the laser beams as objects that are in close proximity will be scanned with relatively low energy levels.

At S470, a 3D map is generated based on the passive and active measurements. In order to generate a 3D-map of the scene, a distance value for pixel in the acquired image should be available. In an embodiment, one or more distance values may be included in the 3D map for each segment in the segmentation map. Each distance value can be one of the passive or active measurements. In a preferred embodiment, at least 3 distance values for at least 3 pixels of each a segment should be included in the 3D map.

As noted above, a segment may be part of an object or may be the entire object. The distance values of all pixels in a segment can be computed or extrapolated based on the at least 3 distance measurements. To this end, in an embodiment, the plane equation is computed based on at least 3 distance measurements for at least 3 pixels in each segment. The computed plane equation may be utilized to determine all distance values of pixels in the same segment and/or on the same surface. It should be noted that other geometric techniques can be utilized the compute the distance values of all pixels in a segment without departing from the scope of the disclosure. It should be further noted that for some segments, distance values for all the pixels will be available through the active or passive measurements and, therefore, there is no need to solve the plane equation for such segments.

In another embodiment, if distance values of all pixels cannot be estimated based on the plane equation, then more active measurements will be triggered.

In yet another embodiment if all distance values of all pixels are available from previous frame, then a limited number of active measurements (e.g., 3 measurements) and the rest of the distance values are adjusted from measurement previously performed.

The rendering of the 3D-surface of each segment causes rendering of 3D representations of the identified objects, thereby resulting in a 3D-map of the scene. The resulting 3D-map can be later utilized to, e.g., provide driving directions to a controller controlling the operation of the vehicle.

Figure 5:
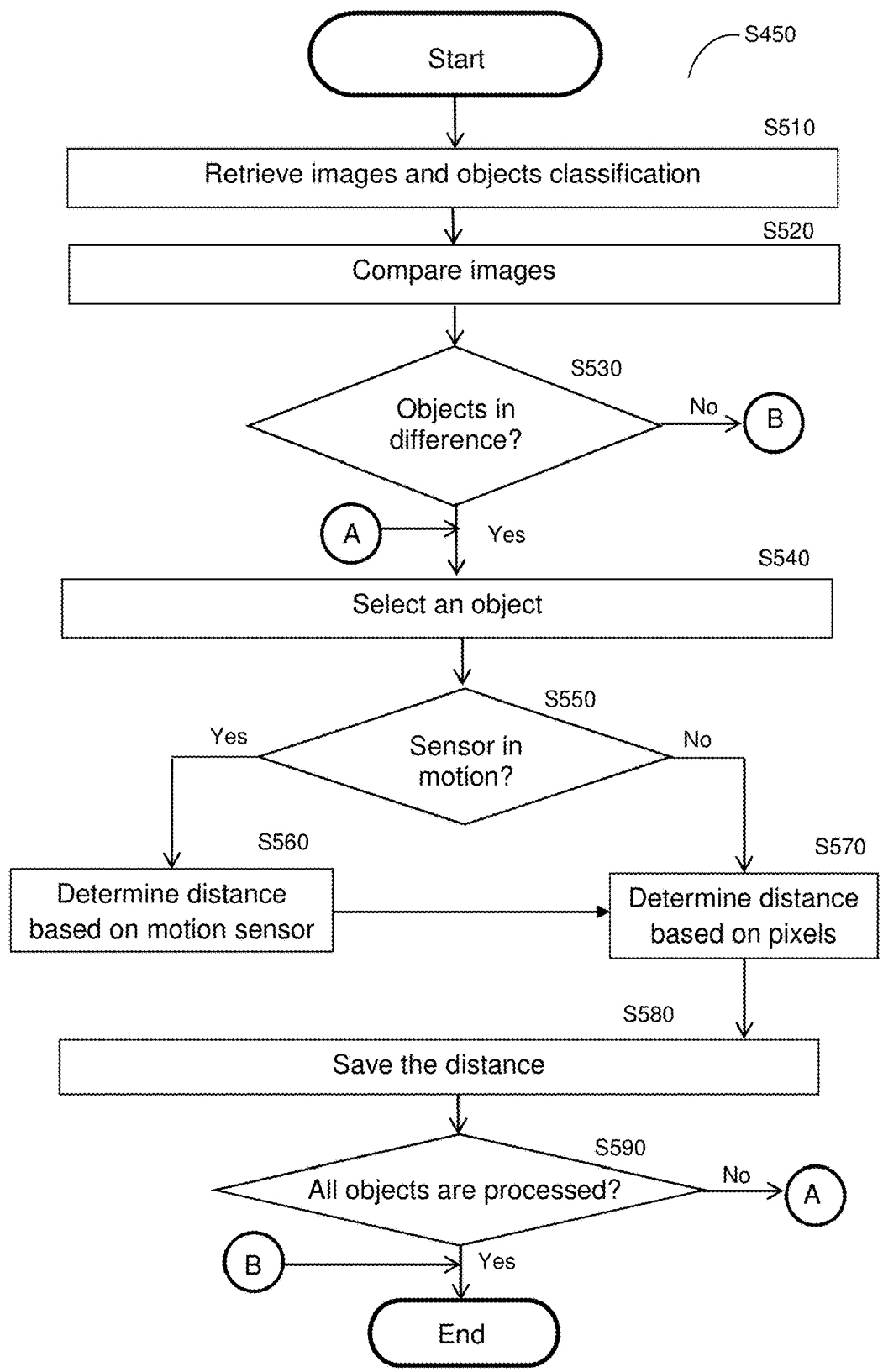
FIG. 5 is a flowchart illustrating a method for performing the passive measurements according to one embodiment.

FIG. 5 is an example flowchart S450 illustrating a method for performing passive measurements based on acquired images according to one embodiment. In an embodiment, the method may be performed by a passive sensor (e.g., the passive sensor 230). At S510, a current acquired image (e.g., an $Image_{n+1}$) and a previously acquired image (e.g., an $Image_n$) together with a list of object classified as stationary are retrieved. At S520, the current and previously acquired images are compared to identify any differences for each object in the images. In an embodiment, S520 may further include transforming one of the images such that the angles of the images are the same. The transformation is performed based on the changes of in the location of the orientation of the sensor.

At S530, it is checked if there are any changes between objects as appearing in each of the images and, if so, execution continues with S540; otherwise, execution terminates. The changes can be based on, e.g., a new stationary object identified in the current image (i.e., an object not appearing in the previously identified image) or new location of a previously identified object (i.e., an object appearing in the previously identified image). When no changes are detected, previously determined distances may be suitable for use as the current distances and, as such, there is typically no need to calculate or recalculate the distance of any of the objects in the current image.

At S540, an object associated with a change between the images is selected. At S550, it is checked if the passive sensor is in motion or was in motion when the current and previously identified images were acquired. If so, execution continues with S560; otherwise, execution continues with S570. Determining whether the passive sensor is in motion may be based on, e.g., information from one or more motion sensors (e.g., an accelerometer, a global positioning system, a gyroscope, a combination thereof, and the like) connected to the passive sensor.

At S560, the distance to the selected object is determined. The distance may be determined based on, e.g., measurements of one or more of the motion sensors. In an embodiment, the motion sensor is a GPS and the distance is computed based on the difference in the GPS coordinates captured when each of the images was taken. In yet another embodiment, the distance from stationary objects can be measured without using GPS by comparing frames (e.g., acquired images) of passive sensor information and/or 3D mapping information. These embodiments are discussed in greater detail above.

At S570, the distance is computed based on pixels in the images. In an embodiment, the distance is computed by recognizing the number of pixels to the object and comparing the number of pixels to a known reference measurement. If the width and the height of the object are known, then the distance can be calculated respective of the known width and height.

Figure 6:
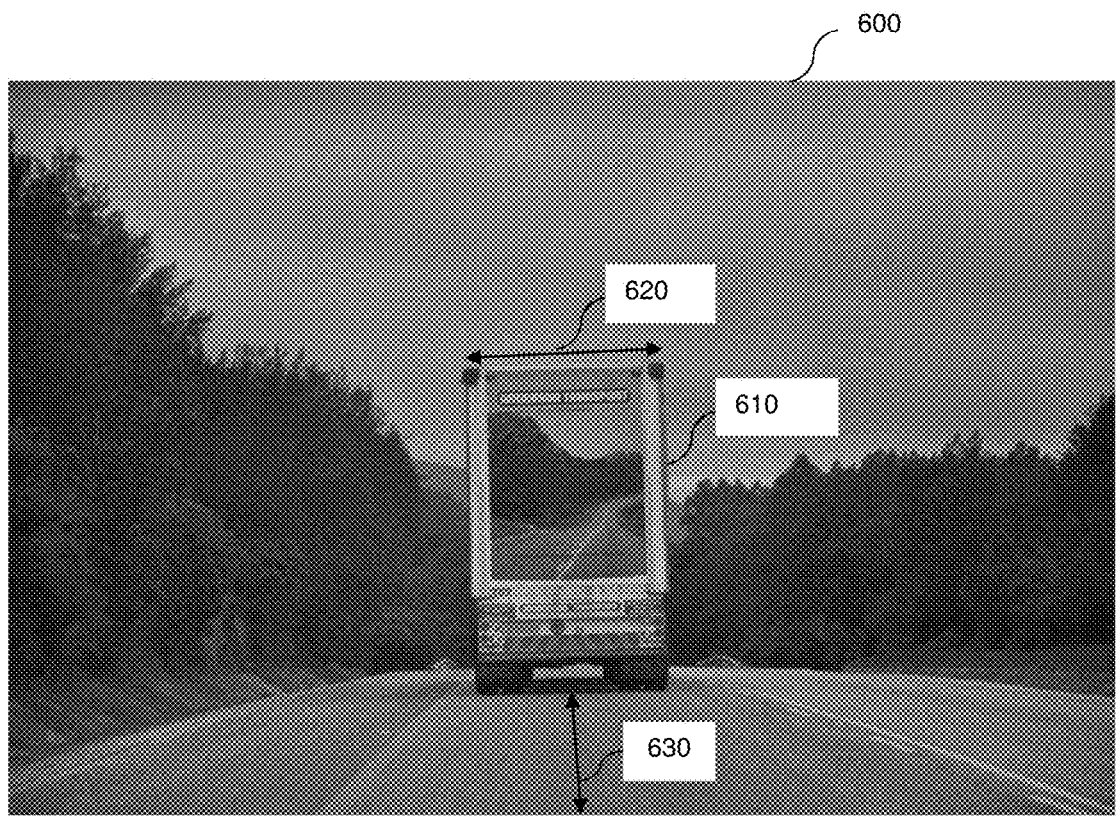
FIG. 6 is an image demonstrating the passive measurements based on a known object size.

FIG. 6 is an example image 600 utilized to describe computing distance based on numbers of pixels to an object. For example, if the width 620 of a truck 610 in the image 600 is composed of 100 pixels and the width in the image 600 is known to represent a length of 1 meter, then if a distance 630 to the truck 610 in the image 600 includes 1000 pixels, it may be determined that the distance to the truck is 10 meters. The reference measurement can be based on previously determined measurements, distances from known objects, known sizes (e.g., height, width, etc.) of objects shown in the image. In an embodiment, the distance can be estimated by computing a vanishing point and a vanishing line in the image. For example, a roof line of building can be severed as a reference measurement.

It should be noted that, in one embodiment, the distance can be passively measured using different techniques to increase the accuracy of the measurement. As noted above, if a particular passive measurement is unreliable, active measurements may be utilized to increase the accuracy of the determined distances.

At S580, the distance is saved (e.g., in a memory). At S590, it is checked if all required distances for changed objects have been determined (i.e., if all objects have been processed). If so, execution terminates; otherwise, execution returns to S540.

Figure 7:
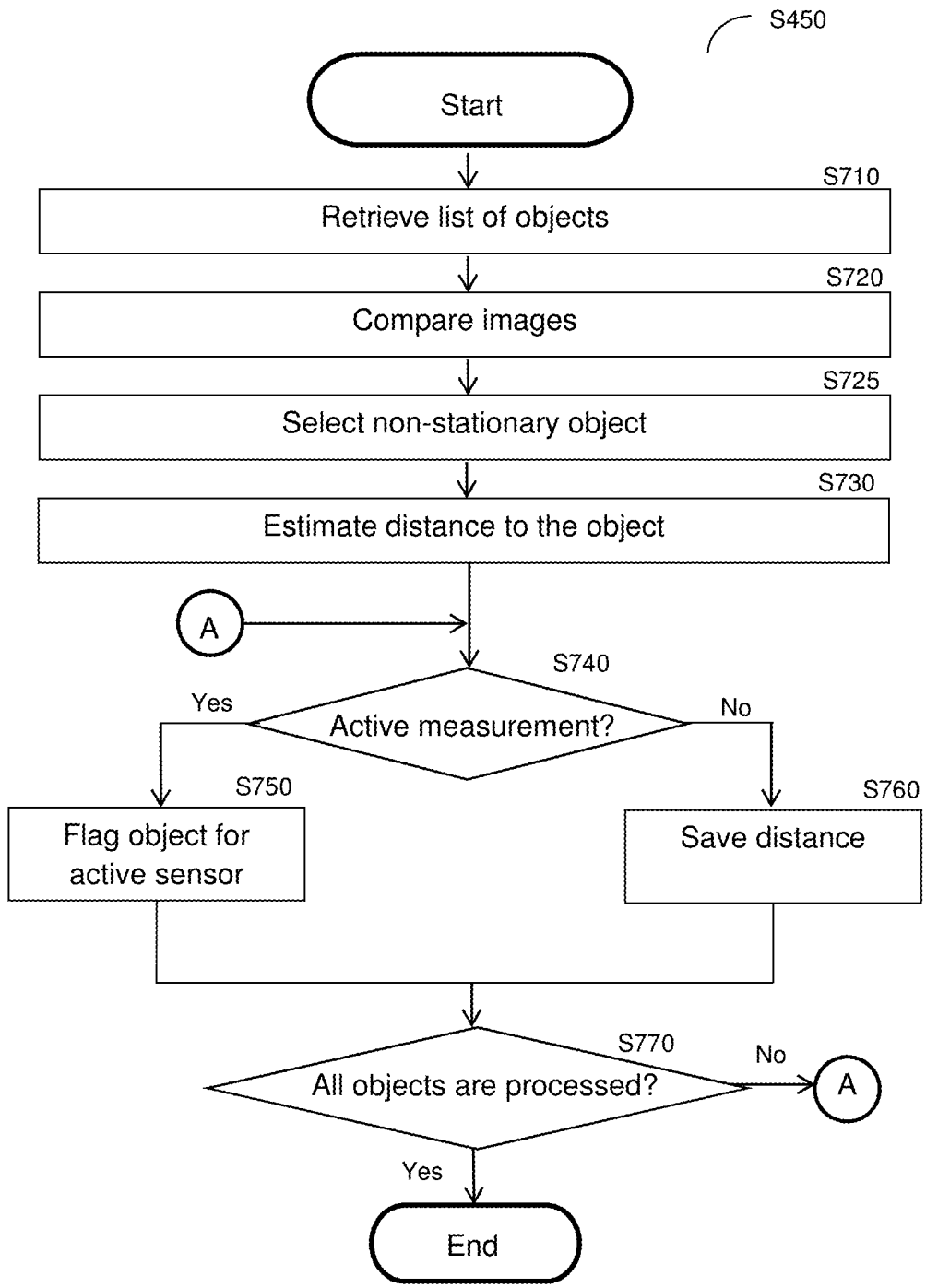
FIG. 7 is a flowchart illustrating a method for performing the passive measurements according to another embodiment.

FIG. 7 shows an example flowchart S450 illustrating a method for performing the passive measurements according to another embodiment. At S710, a current image ($image_{n+1}$), a previously acquired image (imager), and a list of objects classified as non-stationary are retrieved. In an embodiment, for each non-stationary object, its previously measured distance (e.g., with respect to FIG. 1) and a predetermined known speed may also be retrieved. The known speed includes any one of maximum, minimum, or average speed.

At S720, the current and previously acquired images are compared to detect the direction of movement of non-stationary objects. The direction may be, but is not limited to, toward or away from the vehicle, the apparatus, and/or the passive sensor. In a further embodiment, the direction may be a particular angle respective of, e.g., the passive sensor.

At S725, a non-stationary object is selected. At S730, a current distance is estimated for the selected non-stationary object. The current distance may be estimated based on the time elapsed between the captures of the current image and the previously acquired image, the known speed, and the previously measured distance. The current distance may be further estimated based on the determined direction. That is, if the determined direction is toward the vehicle, the current distance may be estimated using the maximum known speed. On the other hand, if the determined direction is away from the vehicle, the distance may be estimated using the minimum known speed. This is performed to cover the worst case scenario (i.e., the distance may be a conservative estimation) with respect to a distance of the object from a vehicle. Such worst case scenario estimations may help to, e.g., prevent crashing of self-controlled vehicles, drones, and the like into moving objects.

At S740 based on the estimated distance, it is determined if an active measurement is required. If so, execution continues with S750; otherwise execution continues with S760. In an embodiment, the estimated distance is compared to a predefined threshold and, if the threshold is not met, then an active measurement is required. An active measurement may be initiated when the object is not within a safe distance. For example, if a person is walking toward the vehicle and the estimated distance is 100 meters, then the person is within a safe distance. However, if the estimated distance of the person walking toward the vehicle is 1 meter, then the person is not within a safe distance, and an active measurement should be trigged.

At S750, upon determining that an active measurement is required, the object is flagged for active measurement. At S760, the estimated distance is saved in the memory. At S770, it is checked if all objects have been processed. If so, execution terminates; otherwise, execution continues with S740.

It should be noted that the embodiments discussed herein above are described with respect to active measurements by lasers merely for simplicity purposes and without limitations on the disclosure. Other active measurements (such as, e.g., by radar, sound and the like) may be equally utilized without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices.

The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for acquiring three-dimensional (3D) maps, comprising:
    analyzing at least one image acquired by a passive sensor to identify a plurality of objects in the at least one image;
    classifying the plurality of objects as any of: a stationary object, a non-stationary object, a suspicious object, and a non-suspicious object;
    determining, based on the classification, whether to passively measure a distance to each of the plurality of objects;
    passively measuring the distance to at least one of the plurality of objects based on the determination;
    wherein the distance to the at least one object is passively measured, for each object classified as a stationary object, when a previous distance to the object is not available;
    actively measuring a distance to some of the plurality of objects, wherein the distance to one of the same of the plurality of objects is actively measured when the distance to the object cannot be passively measured; and
    generating a 3D map of a scene based on the distance measured to each of the plurality of objects.

2. The method of claim 1, wherein analyzing the at least one image further comprises:
    segmenting the at least one image to render a segmentation map; and
    identifying the plurality of objects in the segmentation map.

3. The method of claim 1, further comprising:
    identifying a type of each of the plurality of objects; and
    classifying each of the plurality of objects based on the identified type of the object.

4. The method of claim 1, further comprising:
    comparing the at least one image to a previously acquired image; and
    identifying a change in a location of each of the plurality of objects based on the comparison, wherein each of the plurality of objects is classified based on the change in the location of the object.

5. The method of claim 1, further comprising:
    determining, for each object of the plurality of objects, whether the object is identified in at least one geographic map; and
    classifying each object identified in the at least one geographic map as a stationary object.

6. The method of claim 1, wherein the passively measuring the distance to the at least one object further comprising:
    determining if the passive sensor is in motion;
    determining the distance to the least one object using a motion sensor, when the passive sensor is in motion; and
    determining the distance to the least one object based on the number of the pixels to the object and a known reference measurement, when the passive sensor is not in motion.

7. The method of claim 6, wherein the known reference measurement is at least one of: a number of pixels from a valid reference object, and a dimension of the object.

8. The method of claim 1, wherein passively measuring the distance further comprising, for each object classified as a non-stationary object and as a non-suspicious object:
    determining a boundary speed of the object;
    determining a direction of movement of the object; and
    estimating the distance to the object based on the determined direction and the determined boundary speed.

9. The method of claim 8, further comprising:
    determining if the estimated distance is below a safe distance threshold; and
    actively measuring the distance to the at least one object, when the estimated distance is below the safe distance threshold.

10. The method of claim 1, wherein the distance is actively measured to any object classified as any of: a non-stationary object, and a suspicious object.

11. The method of claim 1, wherein the distance to one of the plurality of objects is actively measured when a reliable passive measurement for the object cannot be determined.

12. The method of claim 1, wherein actively measuring the distance to some of the plurality of objects further comprises:
    performing a number of laser measurements for each actively measured object, wherein the number of laser measurements is determined based on a required resolution.

13. The method of claim 12, further comprising:
    computing, for each actively measured object, a distance to each point in the object based on the laser measurements.

14. The method of claim 1, wherein generating the 3D-map further comprising:
    rendering a 3D-surface of each object using the distance measurements.

15. The method of claim 1, wherein the scene is a field of view captured by an apparatus for causing generation of the 3D-map.

16. A non-transitory computer-readable medium having stored thereon instructions for executing the method according to claim 1.

17. An apparatus for acquiring three-dimensional (3D) maps, comprising:

a passive sensor for acquiring images of a scene;
an active sensor for measuring distances from objects in the scene; and
a processing system, wherein the processing system is configured to:
analyze at least one image acquired by the passive sensor to identify a plurality of objects in the at least one image;
classify the plurality of objects as any of: a stationary object, a non-stationary object, a suspicious object, and a non-suspicious object;
determine, based on the classification, whether to passively measure a distance to each of the plurality of objects;
passively measure the distance to at least one of the plurality of objects based on the determination;
wherein the distance to the at least one object is passively measured, for each object classified as a stationary object, when a previous distance to the object is not available;
actively measure, by the active sensor, a distance to some of the plurality of objects, wherein the distance to one of the plurality of objects is actively measured when the distance to the object cannot be passively measured; and
generate a 3D map of a scene based on the distance measured to each of the plurality of objects.

18. A method for acquiring three-dimensional (3D) maps, comprising:
acquiring at least one image by a passive sensor;
segmenting the at least one image to render a segmentation map;
classifying a plurality of pixels in each segment identified in the segmentation map as any of: a stationary pixel, a non-stationary pixel, a suspicious pixel, and a non-suspicious pixel;
determining, based on the classification, whether to passively measure a distance to each of the plurality of pixels;
passively measuring the distance to at least one of the plurality of pixels based on the determination;
wherein the distance to the at least one pixel is passively measured, for each pixel classified as a stationary pixel, when a previous distance to the pixel is not available;
actively measuring a distance value to each pixel of a first number of pixels in each segment identified in the segmentation map, wherein the first number of pixels is less than the number of pixels in each segment;
computing a distance value to each pixel in the segment using the distance of pixel in the first number of pixels; and
generating a 3D map of a scene based on the measured and computed distance values.

* * * * *